(12) United States Patent
Giloh

(10) Patent No.: US 6,960,740 B2
(45) Date of Patent: Nov. 1, 2005

(54) LASER MODIFICATION OF COMPLEX OBJECTS

(75) Inventor: Ehud Giloh, Salford (GB)

(73) Assignee: TamiCare Ltd., (GB)

( * ) Notice: Subject to any disclaimer, the term of this patent is extended or adjusted under 35 U.S.C. 154(b) by 23 days.

(21) Appl. No.: 10/661,351

(22) Filed: Sep. 12, 2003

(65) Prior Publication Data

US 2004/0149706 A1   Aug. 5, 2004

Related U.S. Application Data

(60) Provisional application No. 60/410,543, filed on Sep. 13, 2002.

(51) Int. Cl.[7] .......................... B23K 26/02; B23K 26/08
(52) U.S. Cl. .............................. 219/121.78; 219/121.79
(58) Field of Search ....................... 219/121.78, 121.79, 219/121.82, 121.85

(56) References Cited

U.S. PATENT DOCUMENTS

| | | | |
|---|---|---|---|
| 4,675,502 A * | 6/1987 | Haefner et al. | ........ 219/124.34 |
| 4,797,532 A | 1/1989 | Maiorov | |
| 4,970,600 A | 11/1990 | Garnier et al. | |
| 5,088,864 A | 2/1992 | Yanagida | |
| 5,143,578 A | 9/1992 | Luthi | |
| 6,517,659 B1 | 2/2003 | VanderWerf et al. | |
| 6,573,473 B2 * | 6/2003 | Hunter et al. | .......... 219/121.69 |
| 6,740,844 B2 | 5/2004 | Rossi | .................... 219/121.59 |
| 6,850,874 B1 * | 2/2005 | Higuerey et al. | .............. 703/4 |
| 2003/0146198 A1 | 8/2003 | Feistel et al. | .......... 219/121.78 |

FOREIGN PATENT DOCUMENTS

| | | |
|---|---|---|
| CN | 1107279 | 8/1995 |
| DE | DE 199 01 530 A1 | 7/2000 |

* cited by examiner

Primary Examiner—M. Alexandra Elve
(74) Attorney, Agent, or Firm—McDonnell Boehnen Hulbert & Berghoff LLP

(57) ABSTRACT

An apparatus and method for perforating, cutting, or engraving a workpiece using a focused laser system to produce a focused laser. The apparatus includes a workpiece former having a complex shape to which the workpiece substantially conforms. The apparatus also includes a positioner that makes an adjustment to keep the focused laser substantially focused on the workpiece as the positional relationship between the workpiece former and the focused laser system changes to an operating position that changes the distance between the workpiece and the focused laser system due to the complex shape of the workpiece former.

9 Claims, 3 Drawing Sheets

LASER MODIFICATION OF COMPLEX OBJECTS

REFERENCE TO RELATED APPLICATIONS

This application claims the benefit of U.S. Provisional Patent Application No. 60/410,543, filed Sep. 13, 2002, the entirety of which is hereby incorporated by reference.

BACKGROUND

1. Field of the Invention

The present invention is directed to cutting, engraving, or perforating products by means of relative movement between the product and an optical beam source.

2. Related Art

Current techniques for cutting and perforating flexible products such as latex rubber gloves and garments involve inefficient manual labor operations. For example, perforations can be made by including protrusions on a former and then abrading any dried latex that forms on the protrusions.

Other techniques, such as mechanical piercing, are limited in both their precision, accuracy, and feature size. Furthermore, manual or purely mechanical techniques can be even more difficult and time consuming if the products must first be removed from the formers on which they are made before processing. Thus, an improved method for quickly and precisely cutting, perforating, and engraving flexible products is needed.

SUMMARY

The present system provides fast, accurate, high density perforating, engraving or cutting of simply or complexly shaped products (such as latex products). A target product is positioned on a carrier (such as a body mannequin or former). The former may be made of a variety of materials such as metal (e.g. aluminum) or porcelain. The former and an optical beam (such as a focused optical beam) are moved relative to one another (either by moving the former, moving the optical beam source, moving the focus, or moving two or all of these simultaneously) so the former is in the proper position relative to the optical beam. The optical beam may then perforate, engrave, cut, or otherwise modify the product on the former. The perforations, engravings, or cuts to the product may be on any portion of the product (such as the front, back, or sides of the product).

BRIEF DESCRIPTION OF THE DRAWINGS

Exemplary embodiments of the present invention are described herein with reference to the drawings, in which.

DETAILED DESCRIPTION

Preferred and alternative embodiments of the subject system and method are described herein. The present invention will be described with respect to certain embodiments and drawings. It will however be apparent to the person skilled in the art that other alternatives and equivalents or embodiments of the invention or combinations thereof can be conceived and reduced to practice without departing from the proper scope of the invention as defined in the appended claims.

Figure 1:
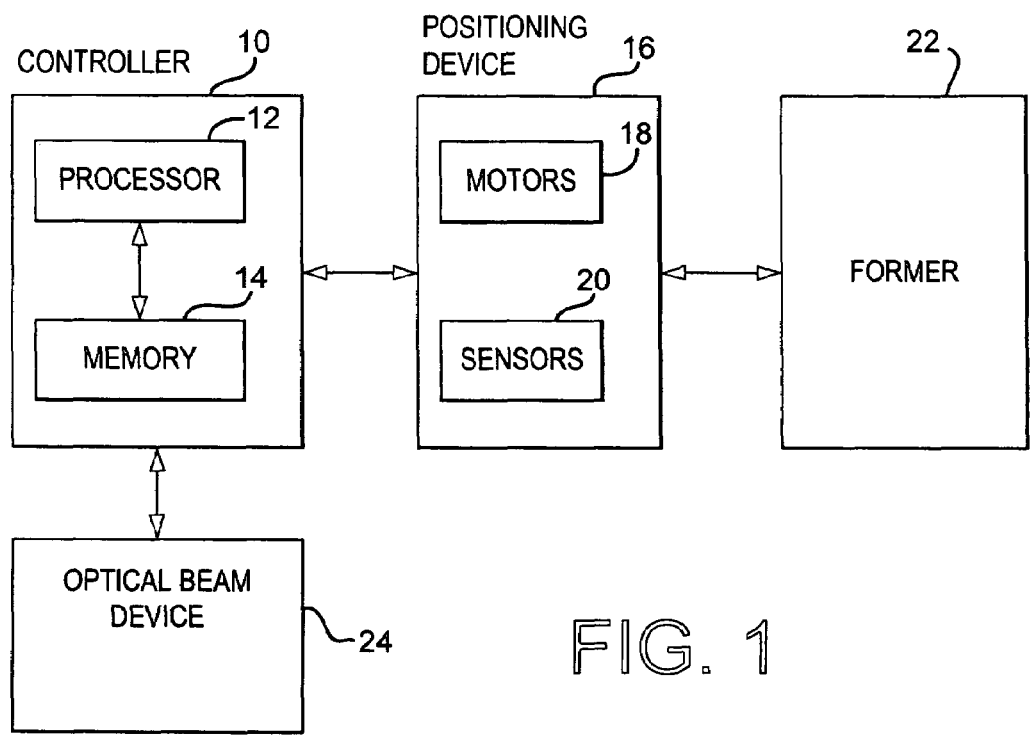
FIG. 1 is a block diagram of one embodiment of the device.

Referring to FIG. 1, there is shown a block diagram of the system. A controller 10 controls the operation of the system. Examples of a controller include, but are not limited to, a computer, a terminal, a workstation, or some other electronic device capable of controlling the operation of the positioning device 16 and the optical beam device 24. The controller 10 includes a processor 12 and a memory 14. The processor 12 may comprise a microprocessor, a microcontroller, or any device which performs arithmetic, logic or control operations. The memory 14 may include non-volatile memory devices such as a ROM, or magnetic or optical memory. The memory 14 may also include volatile memory devices such as a RAM device. Software may be included for the controller to control components within the system, such as the positioning device 16 and optical beam device 24.

The controller 10 communicates with the positioning device 16, as described in more detail below. The positioning device 16 includes at least one motor 18 for moving a former 22 (or alternatively moving the optical beam device 24 or the focus of the optical beam device 24). The positioning device 16 further includes at least one sensor 20 for sensing the position of the former 22 (or alternatively sensing the position of the optical beam device 24). In an alternate embodiment, the sensors may be located within the controller 10. In one embodiment, the positioning device 16 may be a robotic device.

In order to work on the products, the products are preferably positioned on a carrier during perforation, engraving or cutting. The positioning of the product on the carrier enables the product to be given 3-Dimensional proportions (rather than merely 2-Dimensional proportions such as by laying the product flat). In one aspect, the products may be latex rubber or any other elastic or stretchable item.

There is thus provided an apparatus in accordance with a preferred embodiment of the present invention which may include:

1. An optical ray source, optical beam array, split-ray source or multi-ray source.
2. A positioning device comprising a distance determiner and sensors.
3. A product carrier such as a 3-Dimensional curved former.

A method for perforating and cutting may be performed as follows. The former 22 carries a product, and an optical beam device 24 may be positioned relative to the former 22. In one embodiment, the former 22 is positioned, by a positioning device 16 using motors 18, to a process starting point where the distance and focus of the optical beam are in proper working position. The optical beam device 24 is capable of perforating, cutting or engraving the product. In an alternate embodiment, the optical beam device 24 is positioned by the positioning device 16 to a process starting point. In still an alternate embodiment, both the former 22 and the optical beam device 24 may be positioned by the positioning device 16. In one embodiment, the former 22 may comprise a mannequin. In one embodiment, the optical beam device 24 may comprise a $CO_2$ laser which is suitable for cutting or perforating materials. Other types of lasers may be used.

The optical beam device 24 may include a variety of controllable parameters. Examples of the parameters include, but are not limited to, intensity, duration, wavelength, focus and period of time. The parameters of the optical beam may be operated in accordance with the product's characteristics such as material, color, thickness, and in accordance with perforation specifications such as depth, width, dimensions, density, shape, pattern, etc. The parameters for operation of the optical beam may be set automatically or manually. If set automatically, the parameters may be determined by accessing the memory 14 which stores the parameters for operation of the optical beam. Alternatively, the optical beam may scan the product using a sensor or sensors (such as a sensor or sensors included with the positioning device 16) on the former to determine aspects of the product such as material, thickness, color, etc. of the product. Based on this determination, the memory 14 may be accessed to set the parameters for the optical beam based on the aspects of the product.

After the first step of perforating or cutting, the positioning device 16 preferably repositions the former 22 or the optical beam device 24, so that the new position on the former 22 is at the focus plane of the optical beam from the optical beam device 24. In one embodiment, the positioning device 16 moves or rotates the product on the former 22 in front of the optical beam device 24 according to data received from the distance determiner (not shown) and the sensing system 20.

Alternatively, the positioning device 16 moves the optical beam device 24. In another alternative embodiment, the positioning device 16 moves both the former 22 and the optical beam device 24. As another alternative, the positioning device 16 can move one or more focusing lenses so that a workpiece on the former 22 is substantially at the focus plane of the optical beam regardless of a change in the distance between the former 22 and the optical beam device 24.

The distance between the focal plane and the product and the focal length of the ray along the process can be pre-set for all the steps of the perforating process, for instance by mechanical routine, by software, or by any other suitable method known in the art so the positioning device 16 will correct the distance and focus during its movements along the production process.

Alternatively, the determination and adjustment of distance and focus can be done in real-time by a measurement or sensing device, such as an optical device, ultrasonic device (for example, the one or more sensors 20 on the positioning device 16) or other devices known in the art, and the data can be transferred to the controller 10 and to the positioning device 16 for appropriate adjustment of the location of the former 22 in relation to the focal plane.

Figure 2:
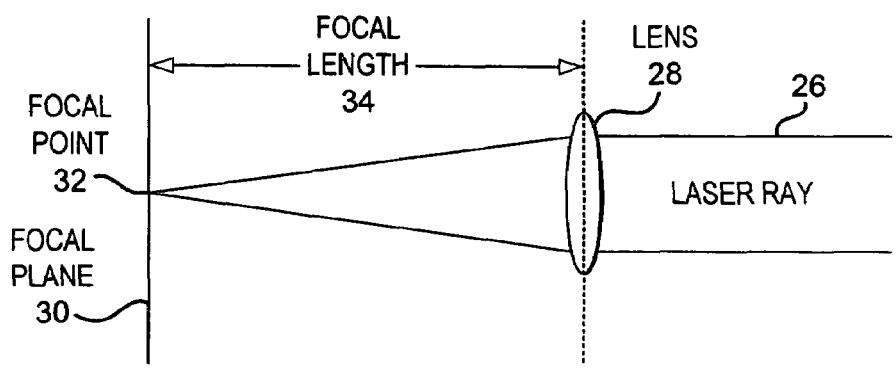
FIG. 2 is a side view of a laser ray, a lens and a focal plane.

Referring to FIG. 2, there is shown a side view of a laser ray 26, a lens 28 and a focal plane 30. The laser ray 26 may be focused onto a focal point 32 in the focal plane 30 using lens 28. Focusing the laser ray 26 allows for better cutting, engraving or perforation. The focal length 34 may vary in distance and may be defined as the distance from the lens 28 to the focal plane 30. One example of a suitable focal length 34 distance is 100 millimeters.

Figure 3:
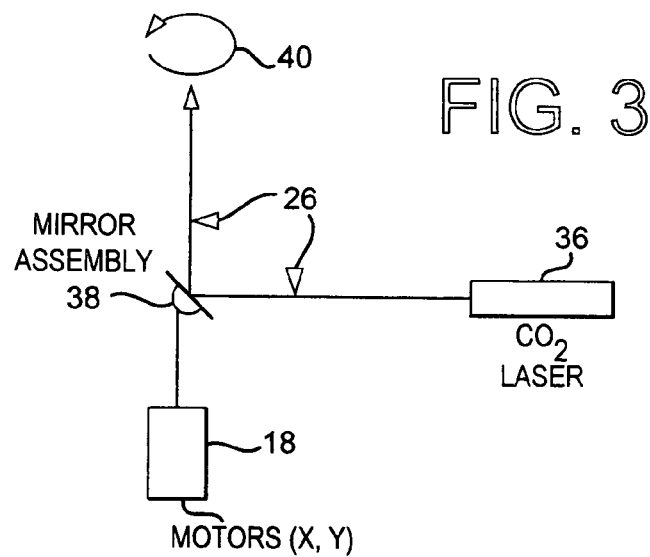
FIG. 3 is a side view of one example of a laser gun and motors.

Referring to FIG. 3, there is shown a side view of one example of a $CO_2$ laser gun 36 and motors 18. The $CO_2$ laser gun 36 outputs a beam which is reflected by mirror assembly 38, which can be, for example, an X-Y system capable of scanning the laser ray 26 in two directions. Motors 18 may drive mirrors in mirror assembly 38 in any direction, such as the x or y directions. This allows for the laser ray 26 reflected by mirror assembly 38 to make particular traces, such as a circular trace 40, as shown in FIG. 3. In this manner, the laser ray 26 may be used to cut, perforate, or engrave certain shapes on the product that is on the former 22. For example, a buttonhole may be cut by controlling the trace of the laser ray 26 so that it travels in a circular or elliptical path. Alternatively, the laser ray 26 may remain stationary and the former 22 may move so that certain shapes may be cut on the product. In still an alternate embodiment, both the laser ray 26 and the former 22 may be moved relative to one another. In one embodiment, the lens 28 is located between the mirror assembly 38 and the former 22, although it is possible for the lens 28 to be located between the $CO_2$ laser gun 36 and the mirror assembly 38.

Figure 4:
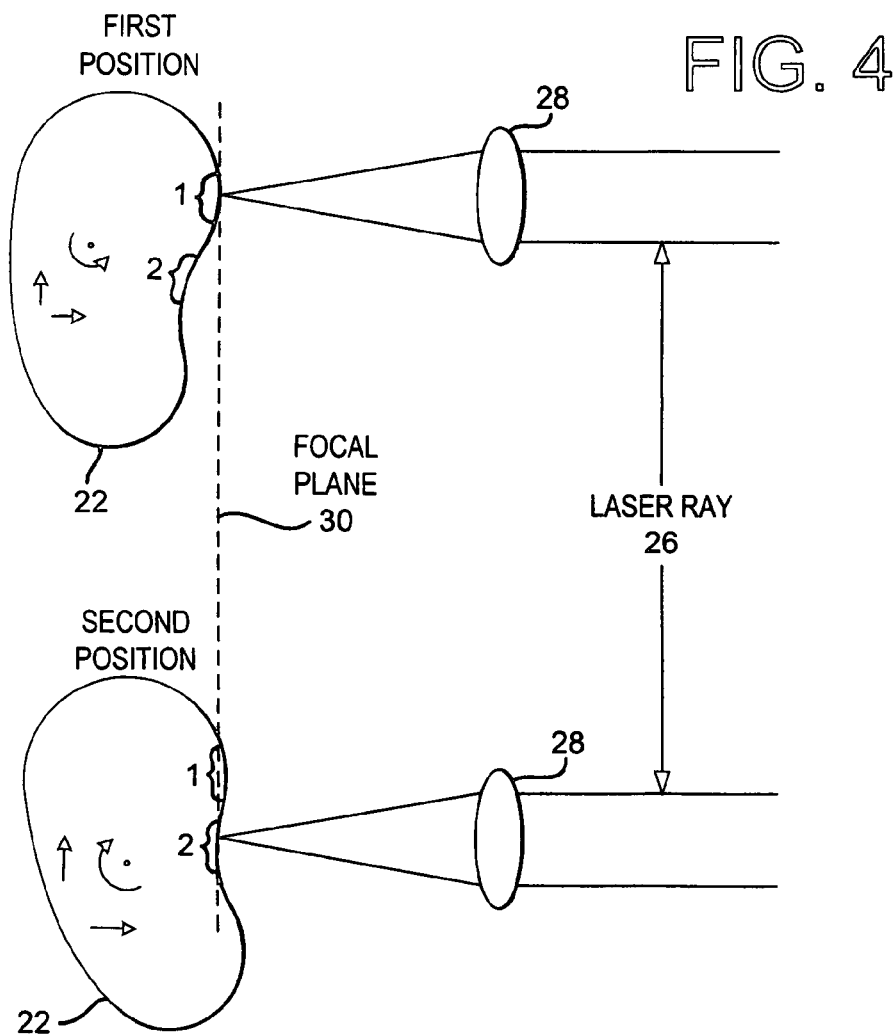
FIG. 4 is a side view of the laser ray, lens and focal plane shown in FIG. 2 with a former in a first position and a second position.

Referring to FIG. 4, there is shown a side view of the laser ray 26, lens 28 and focal plane 30 shown in FIG. 2 with the former 22 in a first position and a second position. The former 22 may be in a first position, with the laser ray 26 being focused on area 1 by lens 28. As shown, an area 1 is in the focal plane 30. Further, the former 22 may be moved (such as by rotating and moving the former 22 in the x, y or z directions) so that a second area, such as an area 2 may be in the focal plane 30. In this manner, different sections of the product on the former 22 may be subject to cutting, perforating, or engraving. In one embodiment, the former 22 may be moved so that the laser ray 26 is in a certain area (such as one of the areas 1, 2 or 3). Within a certain area, the laser ray 26 may be moved (such as by using the motors 18 as shown in FIG. 3). In this manner, rough adjustments as to where the laser ray 26 hits the product may be performed by moving the former 22, while fine adjustments may be performed by moving the laser ray 26 (such as by operating the mirror assembly 38). For example, if one seeks to create a series of small holes in a particular area, the former 22 may be moved to an area (such as the area 1) and the laser ray 26 may be moved to create a series of pinpoint holes (such as in a grid).

Figure 5:
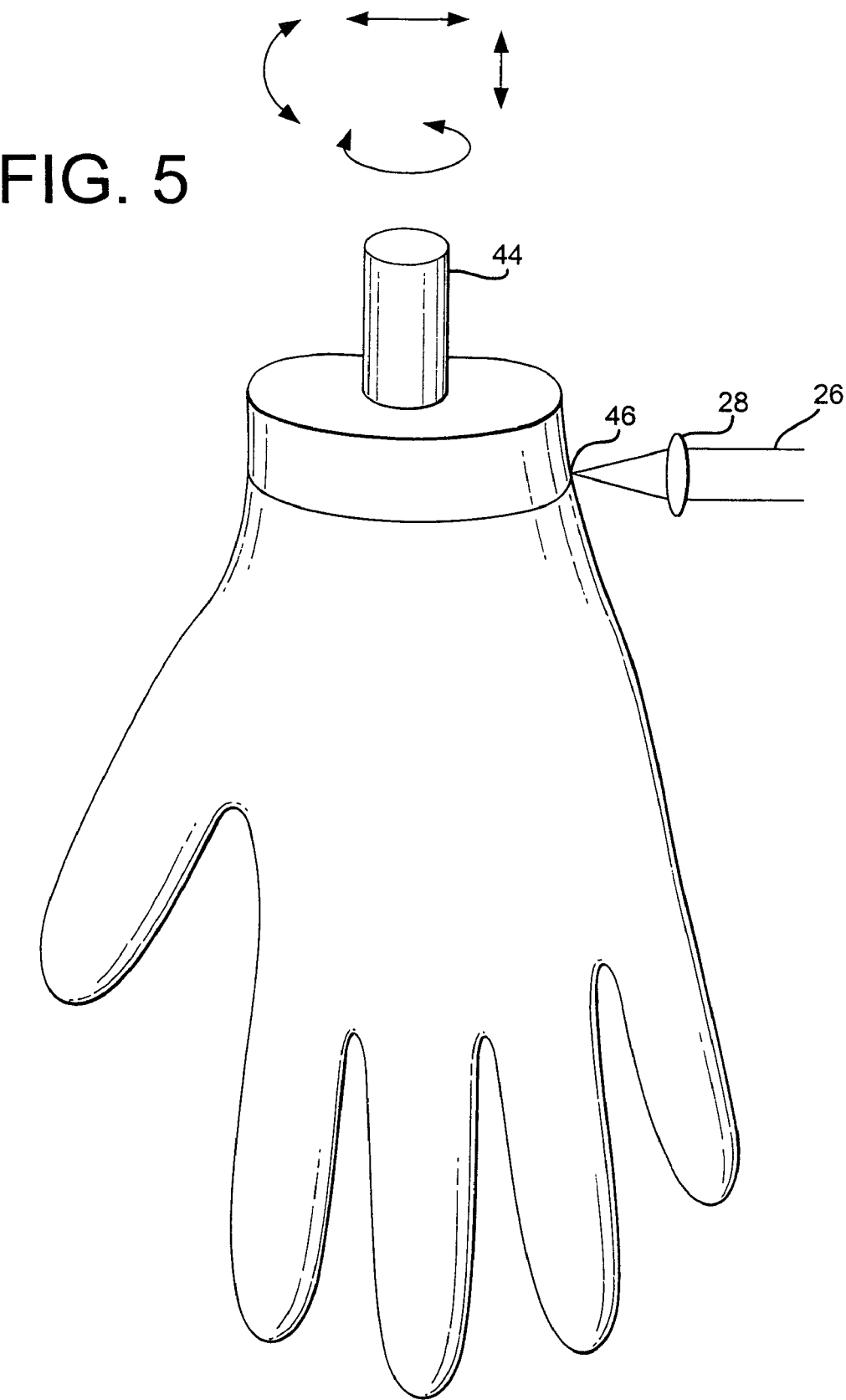
FIG. 5 is a perspective view of a medical glove on a former with a laser ray and lens.

Referring to FIG. 5, there is shown a perspective view of a medical glove on the former 22 with a laser ray 26 and lens 28. The former 22 may be connected to a robotic device (which functions as the positioning device 16). The connection may be made by attaching pole 44 on the former 22 to the robotic device. The former 22 may then be moved. For example, the former 22 may be dipped in a bath (such as a bath of latex liquid). The robotic device may hold former 22 within the bath for a period of time and then be withdrawn from the bath. After the latex liquid on the former 22 solidifies, the product on the former 22 may be cut, engraved, or perforated. The robotic device may move the former 22 in any direction and to any position so that the laser ray 26 may contact any portion on the former 22. For example, to cut the opening of the medical glove (where the hand is inserted), the laser may remain stationary, focusing the laser ray 26 on an upper portion of the former 22 (for example at a point 46) and the robot may move the former 22 in a circular direction so that the cut can be made along the circumference of the glove.

The system is thus suitable for cutting, perforating or engraving non-flat surfaces, polygons, complicated 3D shapes, curved surfaces, asymmetric shapes, etc. and can be used with a wide range of target materials, such as plastics, polymers, rubber, thin polymers layers, elastomers, metals, glass, and more.

One example of the operation of the system is as follows. An industrial robot dips the former 22 in latex liquid, the former 22 is pulled up and the former 22 is positioned by the motors 18 of the positioning device 16 in front of the optical beam device 24 at such a distance that the focus of the laser ray 26 will be accurate and most effective (e.g., positioning the former 22 so that at least a portion of the former 22 is at the focal plane 30) to perforate a target area of the latex film on the former 22. The focus of the laser ray 26 may also be adjusted to give optimal performance instead of, or in addition to changing the distance between optical beam device 24 and the former 22.

The laser ray 26 may then be operated to perforate or cut the product, in accordance with the selected volume, wavelength focus and period of time and in accordance with the product's characteristics as described above.

The former 22 may then be rotated and repositioned by the robot, so that the next area to be perforated is facing the ray source (such as at the focal plane 30), at the same distance and at the same angle to the laser ray 26.

If the former 22 shape is complicated, the robot may be required to make horizontal, vertical, and rotation movements, in order to bring the former 22 to the correct position in 3-Dimensional space relative to the laser. Accordingly, the robot may be required to work in any number of axes.

The focus may also be readjusted and a second step of the perforation may then be carried out within a very short time. These steps may be repeated, so that all the perforations and cutting required are finished in a relatively short time.

The movement of the former 22 in front of the laser ray 26 can be done step-by-step, or in the case of cutting, can be continuous and smooth, with all movements in all axes being done simultaneously, so that a clean cutting line will be formed.

It is also possible that the focus or distance of the optical laser ray 26 from the former 22 may be adjusted during the movement of the former 22. As a result, a hole, group of holes, cuts or engraving may be created in the latex layer while the product is still on the former 22, with no need to remove the product and put it on another device for perforating. In this manner, there is no need to remove the product (such as latex garment) from the former 22 in order to cut/perforate the product (as was done in the prior art). Rather, the cutting, perforating, or engraving may be performed on the former 22 which is used to form the latex product.

It should also be appreciated that this system enables very high-density perforation, where the distance between the holes and the size and shape of the holes are virtually unrestricted and the location and shape of the holes and cuts are very accurate. Further, the edge finish using this system and method is clean.

The method may thus be used to create perforations, in order to make aeration areas, lighted areas, patterns and designs, buttonholes, lace holes, tearing lines, etc. The method may also be used to cut a product's edges, to engrave patterns, or for any other purpose.

Latex products can be gloves, garments, dressings, other body related products, industrial products, or any other products.

Several embodiments of the present invention have been described herein. It is to be understood, however, that changes and modifications may be made in these described embodiments without departing from the true scope of the invention, which is defined by the following claims.

I claim:

1. A method of modifying a thin flexible workpiece that conforms to a workpiece former having a complex shape, the method using a focused laser produced by a focused laser system, the method comprising:

changing the positional relationship between the focused laser system and the workpiece former to establish a first operating position where the surface of the workpiece is substantially at the focal length of the focused laser where the focused laser meets the workpiece;

changing the positional relationship between the focused laser system and the workpiece former to establish a second operating position that changes the distance between the workpiece and the focused laser system due to the complex shape of the workpiece former; and making an adjustment to keep the focused laser substantially focused on the workpiece at the second operating position.

2. The method of claim 1, wherein the adjustment comprises moving the workpiece former in a direction substantially parallel to an axis about which the focused laser is symmetric.

3. The method of claim 1, wherein the adjustment comprises moving the focused laser system in a direction substantially parallel to an axis about which the focused laser is symmetric.

4. The method of claim 1, wherein the adjustment comprises moving a lens in the focused laser system.

5. The method of claim 1, further comprising: sensing the change in distance between the workpiece and the focused laser system caused by changing the positional relationship between the focused laser system and the workpiece former from the first operating position to the second operating position, wherein the adjustment is made in response to the sensed change in distance.

6. The method of claim 1, further comprising: referring to data stored in a memory that correlates the change in distance between the workpiece and the focused laser system to motion from the first operating position to the second operating position, wherein the adjustment is made in response to the data stored in the memory.

7. A method of producing a flexible workpiece that conforms to a workpiece former having a complex shape, the method using a focused laser produced by a focused laser system, the method comprising the following steps in order:

moving the workpiece former into liquid rubber;

removing the workpiece from the liquid rubber and allowing the liquid rubber to dry on the workpiece;

changing the positional relationship between the focused laser system and the workpiece former to establish a first operating position where the surface of the workpiece is substantially at the focal length of the focused laser where the laser meets the workpiece;

activating the focused laser system;

changing the positional relationship between the focused laser system and the workpiece former to establish a second operating position that changes the distance between the workpiece and the focused laser system due to the complex shape of the workpiece former; and making an adjustment to keep the focused laser substantially focused on the workpiece at the second operating position.

8. The method of claim 7, further comprising: deactivating the focused laser system before establishing the second operating position; and activating the focused laser system after the second operating position is established.

9. The method of claim 7, wherein the focused laser system remains activated as the positional relationship between the focused laser system and the workpiece former is changed.

* * * * *